United States Patent
Farooqi et al.

(10) Patent No.: US 10,575,222 B2
(45) Date of Patent: Feb. 25, 2020

(54) SERVING CELL MANAGEMENT

(71) Applicant: Nokia Solutions and Networks Oy, Espoo (FI)

(72) Inventors: Faisal Farooqi, Hoffman Estates, IL (US); Tarun Agarwal, Palatine, IL (US); Akila Srinivasan, Carpentersville, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/745,581

(22) PCT Filed: Aug. 13, 2015

(86) PCT No.: PCT/US2015/045023
§ 371 (c)(1),
(2) Date: Jan. 17, 2018

(87) PCT Pub. No.: WO2017/027035
PCT Pub. Date: Feb. 16, 2017

(65) Prior Publication Data
US 2018/0220342 A1    Aug. 2, 2018

(51) Int. Cl.
*H04W 36/00* (2009.01)
(52) U.S. Cl.
CPC ............... *H04W 36/0061* (2013.01)
(58) Field of Classification Search
CPC ............... H04W 36/0061; H04W 36/00835
See application file for complete search history.

(56) References Cited

U.S. PATENT DOCUMENTS

| 2003/0013443 A1* | 1/2003 | Willars | H04W 36/0061 455/432.1 |
| 2005/0059408 A1* | 3/2005 | Tiedemann, Jr. | H04W 28/08 455/452.1 |
| 2008/0167041 A1* | 7/2008 | Wang | H04W 36/30 455/436 |

(Continued)

FOREIGN PATENT DOCUMENTS

| EP | 2800449 A1 | 11/2014 | |
| WO | WO-2008057658 A2 * | 5/2008 | H04W 28/16 |

(Continued)

OTHER PUBLICATIONS

3GPP TSG-RAN WG3 Meeting#69, Madrid, Spain Aug. 23-27, 2010; R3-102356 All Cell Information in Served Cell Information in X2 Setup/eNB Configuration Update; Nokia Siemens Network; Aug. 27, 2010.*

(Continued)

*Primary Examiner* — Jael M Ulysse
(74) *Attorney, Agent, or Firm* — Brake Hughes Bellermann LLP

(57) ABSTRACT

There is provided a method comprising determining a first subset of cells served by a first base station to be suitable for handover to a user equipment associated with a second base station, the subset comprising at least one but not all of the cells served by the first base station and providing information to the second base station from the first base station, said information comprising an indication of the determined first subset of cells.

15 Claims, 10 Drawing Sheets

(56) References Cited

U.S. PATENT DOCUMENTS

| | | | | |
|---|---|---|---|---|
| 2010/0008293 | A1* | 1/2010 | Gupta | H04W 92/20 370/328 |
| 2010/0130212 | A1* | 5/2010 | So | H04W 36/08 455/444 |
| 2010/0265913 | A1* | 10/2010 | Gorokhov | H04W 36/0055 370/331 |
| 2010/0267387 | A1* | 10/2010 | Stephens | H04W 36/22 455/436 |
| 2010/0322079 | A1* | 12/2010 | Kitazoe | H04W 36/0088 370/241 |
| 2011/0269464 | A1* | 11/2011 | Xu | H04W 36/0033 455/436 |
| 2012/0142355 | A1* | 6/2012 | Jha | H04W 36/0061 455/436 |
| 2013/0023301 | A1 | 1/2013 | Wang et al. | |
| 2013/0040673 | A1* | 2/2013 | Siomina | G01S 5/0226 455/501 |
| 2013/0059590 | A1* | 3/2013 | Teyeb | H04W 36/0061 455/438 |
| 2013/0084864 | A1* | 4/2013 | Agrawal | H04W 36/0083 455/436 |
| 2013/0208702 | A1* | 8/2013 | Sandberg | H04W 24/02 370/331 |
| 2013/0231115 | A1* | 9/2013 | Lin | H04W 36/0083 455/436 |
| 2013/0250917 | A1* | 9/2013 | Xu | H04W 48/02 370/331 |
| 2014/0211762 | A1* | 7/2014 | Bontu | H04W 36/30 370/332 |
| 2015/0036598 | A1* | 2/2015 | Kilpatrick, II | H04W 64/00 370/329 |
| 2015/0036663 | A1* | 2/2015 | Kilpatrick, II | H04W 36/245 370/332 |

FOREIGN PATENT DOCUMENTS

| | | |
|---|---|---|
| WO | 2010/050885 A1 | 5/2010 |
| WO | 2010/147524 A1 | 12/2010 |
| WO | 2012/158086 A1 | 11/2012 |
| WO | 2014/069954 A1 | 5/2014 |

OTHER PUBLICATIONS

"3rd Generation Partnership Project; Technical Specification Group Radio Access Network; Evolved Universal Terrestrial Radio Access Network (E-UTRAN); X2 application protocol (X2AP) (Release 10)", 3GPP TS 36.423, V10.7.0, Sep. 2013, pp. 1.132.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2 (Release 12)", 3GPP TS 36.300, V12.5.0, Mar. 2015, pp. 1-251.

"3rd Generation Partnership Project; Technical Specification Group Radio Access Network; Evolved Universal Terrestrial Radio Access (E-UTRA); Base Station (BS) radio transmission and reception (Release 12)", 3GPP TS 36.104, V12.7.0, Mar. 2015, pp. 1-155.

"3rd Generation Partnership Project; Technical Specification Group Radio Access Network; Evolved Universal Terrestrial Radio Access (E-UTRA); Physical channels and modulation(Release 12)", 3GPP TS 36.211, V12.5.0, Mar. 2015, pp. 1-136.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.5.0, Mar. 2015, pp. 1-445.

"3rd Generation Partnership Project; Technical Specification Group Core Network and Terminals; Numbering, addressing and identification (Release 13)", 3GPP TS 23.003, V13.1.0, Mar. 2015, pp. 1-92.

International Search Report and Written Opinion received for corresponding Patent Cooperation Treaty Application No. PCT/US2015/045023, dated Mar. 8, 2016, 11 pages.

"All Cell Information in Served Cell Information in X2 Setup/eNB Configuration Update", 3GPP TSG-RAN WG3 Meeting #69, R3-102356, Nokia Siemens Networks, Agenda item: 11.10, Aug. 23-27, 2010, 5 pages.

"X2 Setup and X2AP Msg Routing", 3GPP TSG RAN WG3 #79 meeting, R3-130077, Nokia Siemens Networks, Agenda item: 13.3, Jan. 28-Feb. 1, 2013, 3 pages.

* cited by examiner

Figure 4

420 — Receiving information from a first base station at a second base station, said information comprising an indication of a first subset of cells served by the first base station determined to be suitable for handover to a user equipment associated with the second base station, the subset comprising at least one but not all of the cells served by the first base station

SERVING CELL MANAGEMENT

RELATED APPLICATION

This application was originally filed as PCT Application No. PCT/US2015/045023 filed Aug. 13, 2015.

FIELD

The present application relates to a method, apparatus and system and in particular but not exclusively, to exchanging serving cell information between neighbouring eNBs in a communication system.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases.

SUMMARY OF THE INVENTION

In a first aspect there is provided a method comprising determining a first subset of cells served by a first base station to be suitable for handover to a user equipment associated with a second base station, the subset comprising at least one but not all of the cells served by the first base station and providing information to the second base station from the first base station, said information comprising an indication of the determined first subset of cells.

The method may comprise determining the first subset of cells to be suitable for handover in dependence on at least one of location, radio frequency measurements associated with a user equipment, X2 procedure information received from at least one neighbour base station, deployment configuration and operator selection.

The first base station may be a first eNB. The second base station may be a second eNB. The information may be provided over an X2 interface.

The method may comprise providing the information in one of an X2 setup request message, an X2 setup response message, an eNB configuration update request message and an eNB configuration update response message.

The method may comprise determining the first subset of cells in dependence on a request received from the second base station, said request indicating at least one cell served by the first base station to be included in the first subset.

The request from the second base station may be one of an X2 setup request message and an eNB configuration update request message.

The method may comprise determining at least one second subset of cells served by the first base station to be suitable for handover to a user equipment associated with at least one third base station, respectively, the subset comprising at least one but not all of the cells served by the first base station.

In a second aspect there is provided a method comprising receiving information from a first base station at a second base station, said information comprising an indication of a first subset of cells served by the first base station determined to be suitable for handover to a user equipment associated with the second base station, the subset comprising at least one but not all of the cells served by the first base station.

The at least one first cell may be determined to be suitable for handover in dependence on at least one of location, radio frequency measurements associated with a user equipment, X2 procedure information received from at least one neighbour base station, deployment configuration and operator selection.

The first base station may be a first eNB. The second base station may be a second eNB. The first interface may be an X2 interface.

The method may comprise receiving the information in one of an X2 setup request message, an X2 setup response message, an eNB configuration update request message and an eNB configuration update response message.

The method may comprise causing a request to be sent to the first base station, said request indicating at least one cell served by the first base station to be included in the first subset of cells.

The request from the second base station may be one of an X2 setup request message and an eNB configuration update request message.

In a third aspect there is provided an apparatus, said apparatus comprising means for determining a first subset of cells served by a first base station to be suitable for handover to a user equipment associated with a second base station, the subset comprising at least one but not all of the cells served by the first base station and means for providing information to the second base station from the first base station, said information comprising an indication of the determined first subset of cells.

The apparatus may comprise means for determining the first subset of cells to be suitable for handover in dependence on at least one of location, radio frequency measurements associated with a user equipment, X2 procedure information received from at least one neighbour base station, deployment configuration and operator selection.

The first base station may be a first eNB. The second base station may be a second eNB. The information may be provided over an X2 interface.

The apparatus may comprise means for providing the information in one of an X2 setup request message, an X2 setup response message, an eNB configuration update request message and an eNB configuration update response message.

The apparatus may comprise means for determining the first subset of cells in dependence on a request received from the second base station, said request indicating at least one cell served by the first base station to be included in the first subset.

The request from the second base station may be one of an X2 setup request message and an eNB configuration update request message.

The apparatus may comprise means for determining at least one second subset of cells served by the first base station to be suitable for handover to a user equipment associated with at least one third base station, respectively, the subset comprising at least one but not all of the cells served by the first base station.

In a fourth aspect there is provide an apparatus comprising means for receiving information from a first base station at a second base station, said information comprising an indication of a first subset of cells served by the first base station determined to be suitable for handover to a user equipment associated with the second base station, the subset comprising at least one but not all of the cells served by the first base station.

The at least one first cell may be determined to be suitable for handover in dependence on at least one of location, radio frequency measurements associated with a user equipment, X2 procedure information received from at least one neighbour base station, deployment configuration and operator selection.

The first base station may be a first eNB. The second base station may be a second eNB. The first interface may be an X2 interface.

The apparatus may comprise means for receiving the information in one of an X2 setup request message, an X2 setup response message, an eNB configuration update request message and an eNB configuration update response message.

The apparatus may comprise means for may comprise causing a request to be sent to the first base station, said request indicating at least one cell served by the first base station to be included in the first subset of cells.

The request from the second base station may be one of an X2 setup request message and an eNB configuration update request message.

In a fifth aspect there is provided an apparatus, said apparatus comprising at least one processor and at least one memory including a computer program code, the at least one memory and the computer program code configured to, with the at least one processor, cause the apparatus at least to determine a first subset of cells served by a first base station to be suitable for handover to a user equipment associated with a second base station, the subset comprising at least one but not all of the cells served by the first base station and provide information to the second base station from the first base station, said information comprising an indication of the determined first subset of cells.

The apparatus may be configured to determine the first subset of cells to be suitable for handover in dependence on at least one of location, radio frequency measurements associated with a user equipment, X2 procedure information received from at least one neighbour base station, deployment configuration and operator selection.

The first base station may be a first eNB. The second base station may be a second eNB. The information may be provided over an X2 interface.

The apparatus may be configured to provide the information in one of an X2 setup request message, an X2 setup response message, an eNB configuration update request message and an eNB configuration update response message.

The apparatus may be configured to determine the first subset of cells in dependence on a request received from the second base station, said request indicating at least one cell served by the first base station to be included in the first subset.

The request from the second base station may be one of an X2 setup request message and an eNB configuration update request message.

The apparatus may be configured to determine at least one second subset of cells served by the first base station to be suitable for handover to a user equipment associated with at least one third base station, respectively, the subset comprising at least one but not all of the cells served by the first base station.

In a sixth aspect there is provided an apparatus comprising at least one processor and at least one memory including a computer program code, the at least one memory and the computer program code configured to, with the at least one processor, cause the apparatus at least to receive information from a first base station at a second base station, said information comprising an indication of a first subset of cells served by the first base station determined to be suitable for handover to a user equipment associated with the second base station, the subset comprising at least one but not all of the cells served by the first base station.

The at least one first cell may be determined to be suitable for handover in dependence on at least one of location, radio frequency measurements associated with a user equipment, X2 procedure information received from at least one neighbour base station, deployment configuration and operator selection.

The first base station may be a first eNB. The second base station may be a second eNB. The first interface may be an X2 interface.

The apparatus may be configured to receive the information in one of an X2 setup request message, an X2 setup response message, an eNB configuration update request message and an eNB configuration update response message.

The apparatus may be configured to cause a request to be sent to the first base station, said request indicating at least one cell served by the first base station to be included in the first subset of cells.

The request from the second base station may be one of an X2 setup request message and an eNB configuration update request message.

In a seventh aspect there is provided a computer program embodied on a non-transitory computer-readable storage medium, the computer program comprising program code for controlling a process to execute a process, the process comprising determining a first subset of cells served by a first base station to be suitable for handover to a user equipment associated with a second base station, the subset comprising at least one but not all of the cells served by the first base station and providing information to the second base station from the first base station, said information comprising an indication of the determined first subset of cells.

The process may comprise determining the first subset of cells to be suitable for handover in dependence on at least one of location, radio frequency measurements associated with a user equipment, X2 procedure information received from at least one neighbour base station, deployment configuration and operator selection.

The first base station may be a first eNB. The second base station may be a second eNB. The information may be provided over an X2 interface.

The process may comprise providing the information in one of an X2 setup request message, an X2 setup response message, an eNB configuration update request message and an eNB configuration update response message.

The process may comprise determining the first subset of cells in dependence on a request received from the second base station, said request indicating at least one cell served by the first base station to be included in the first subset.

The request from the second base station may be one of an X2 setup request message and an eNB configuration update request message.

The process may comprise determining at least one second subset of cells served by the first base station to be suitable for handover to a user equipment associated with at least one third base station, respectively, the subset comprising at least one but not all of the cells served by the first base station.

In an eighth aspect there is provided a computer program embodied on a non-transitory computer-readable storage medium, the computer program comprising program code for controlling a process to execute a process, the process comprising receiving information from a first base station at a second base station, said information comprising an indication of a first subset of cells served by the first base station determined to be suitable for handover to a user equipment associated with the second base station, the subset comprising at least one but not all of the cells served by the first base station.

The at least one first cell may be determined to be suitable for handover in dependence on at least one of location, radio frequency measurements associated with a user equipment, X2 procedure information received from at least one neighbour base station, deployment configuration and operator selection.

The first base station may be a first eNB. The second base station may be a second eNB. The first interface may be an X2 interface.

The process may comprise receiving the information in one of an X2 setup request message, an X2 setup response message, an eNB configuration update request message and an eNB configuration update response message.

The process may comprise causing a request to be sent to the first base station, said request indicating at least one cell served by the first base station to be included in the first subset of cells.

The request from the second base station may be one of an X2 setup request message and an eNB configuration update request message.

In a ninth aspect there is provided a computer program product for a computer, comprising software code portions for performing the steps the method of the first aspect when said product is run on the computer.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 4 shows an example method of exchanging served cell information between eNBs;

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
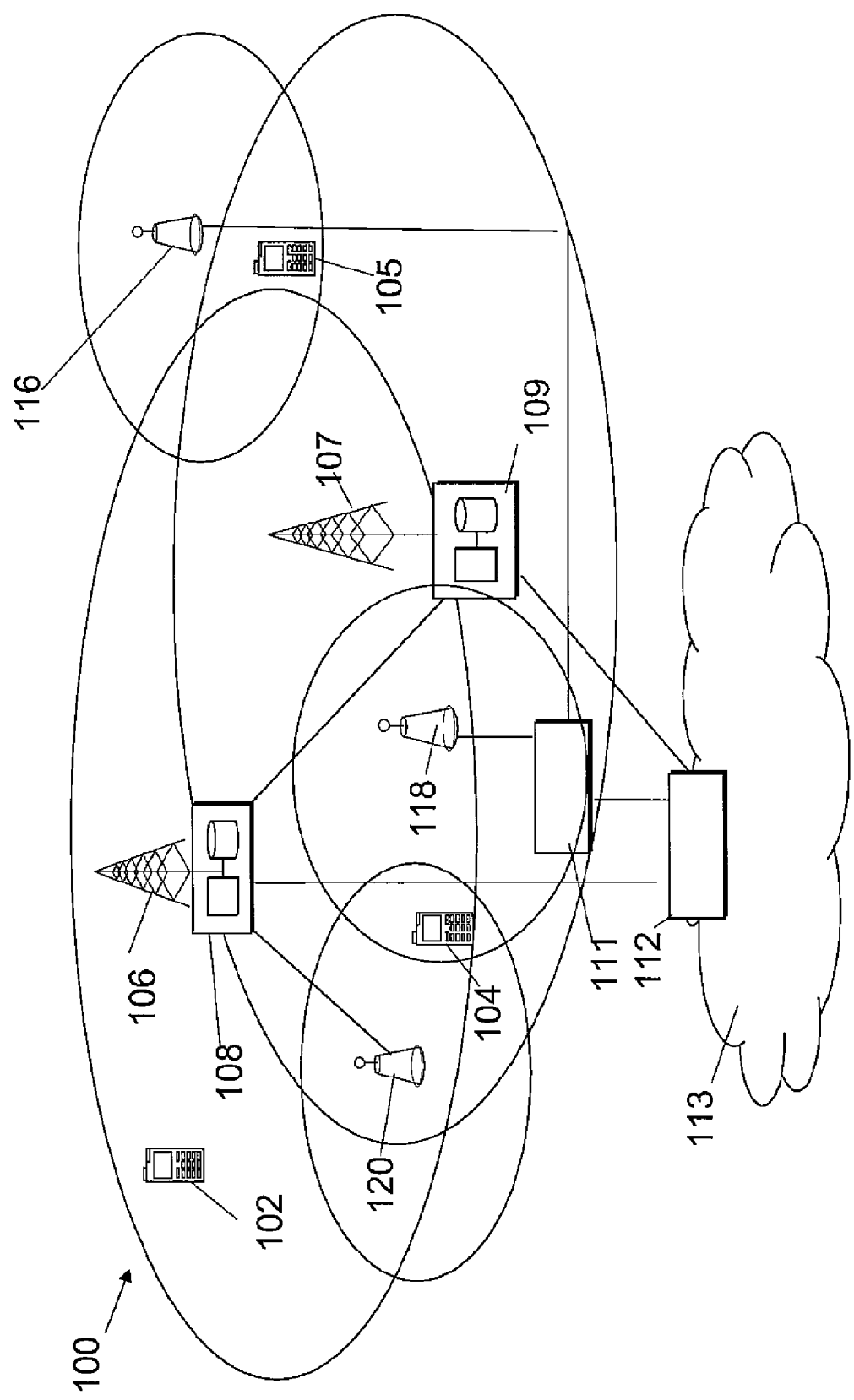
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller. The control apparatus may provide an apparatus such as that discussed in relation to FIG. 10.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be collocated.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
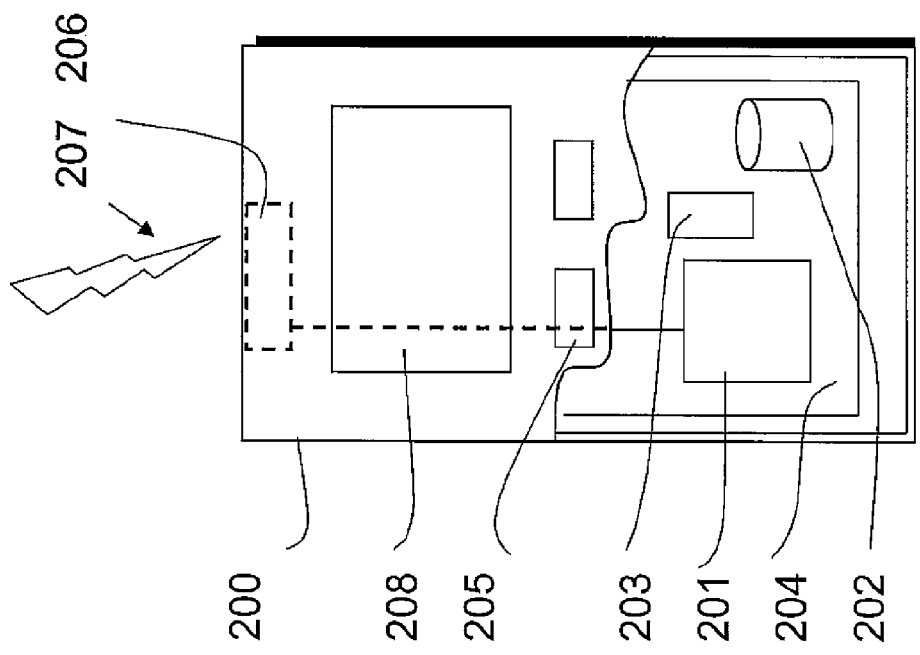
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). A base station can provide coverage for an entire cell, a plurality of cells, or similar radio service area.

Communication between eNBs may take place over an X2 interface. 3GPP X2 Application Protocol (X2AP) specification defines how eNBs exchange served cell information, i.e. information about the cells associated with a respective base station or eNB. Served cell information exchange may occur either via X2 Setup procedure or via eNB Configuration Update procedure.

The 3GPP X2AP specification allows up to 256 served cells, and corresponding neighbour cell information, to be included in configuration exchange (X2 Setup and eNB Configuration Update) procedures. In addition the 3GPP specification also requires all served cells to be included in the configuration exchange messages.

The requirement to exchange information for all serving cells becomes a limitation in a network which comprises eNBs with varying number of serving cells. An eNB receiving a configuration message is required to handle and process information associated with all the served cells of a neighbour eNB even if only a subset of served cells on the neighbour eNB will be handover candidates. The requirement to process all neighbours may result in suboptimal handover preparation times and also complicate self optimization algorithms such as physical cell identity (PCI) assignment.

The configuration exchange procedures may introduce unnecessary memory overhead and CPU processing load on eNBs. For small form factor eNBs, these requirements and processing load may become significant as a micro or pico eNB will have to process all cells reported by neighbour eNBs.

Figure 3:
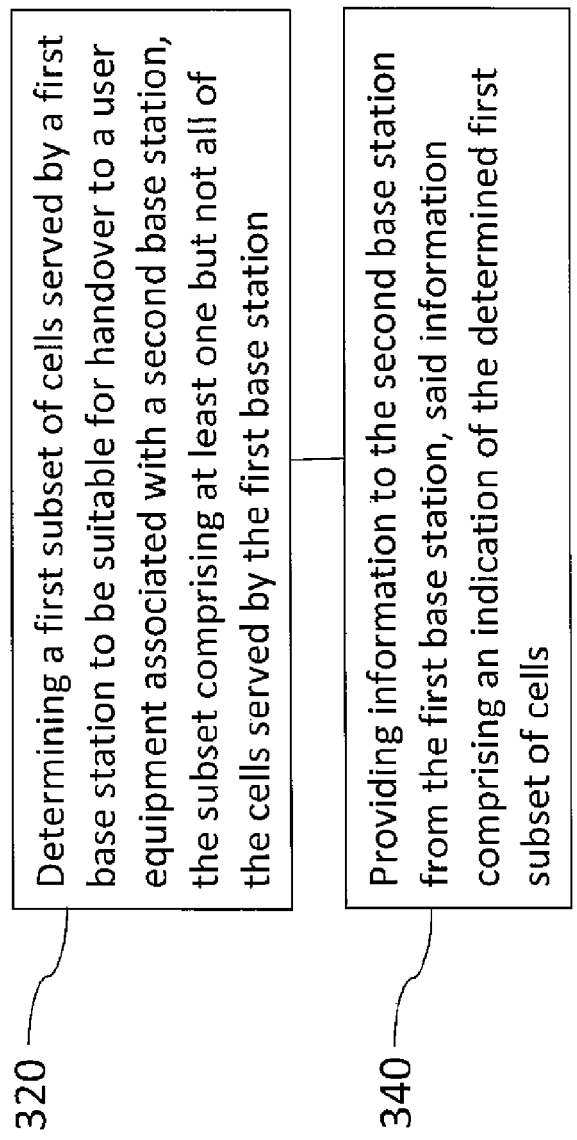
FIG. 3 shows an example method of exchanging served cell information between eNBs.

FIG. 3 shows a flowchart of an example method of exchanging served cell information between neighbouring eNBs. The method comprises, in step 320, of determining a first subset of cells served by a first base station to be suitable for handover to a user equipment associated with a second base station, the subset comprising at least one but not all of the cells served by the first base station.

In step 340, the method comprises providing information to the second base station from the first base station, said information comprising an indication of the determined first subset of cells.

FIG. 4 shows a flowchart of an example method of exchanging served cell information between neighbouring eNBs. The method comprises, in step 420, receiving information from a first base station at a second base station, said information comprising an indication of a first subset of cells served by the first base station determined to be suitable for handover to a user equipment associated with the second base station, the subset comprising at least one but not all of the cells served by the first base station.

The first and second base stations may be neighbouring base stations. The first and second base stations may be first and second eNBs. The interface between the first and second base station may be an X2 interface. A cell served by a first base station which is suitable for handover to a user equipment associated with a second base station may be referred to as a handover candidate.

In an embodiment, the information comprises 3GPP message fields introduced to enhance the served cell information in X2 setup procedure and eNB configuration exchange procedures. The IEs introduced in the messages may allow eNBs involved in X2 setup procedure or eNB configuration exchange procedure to indicate serving cells as handover candidates to neighbour eNBs.

The information may be provided in one of an X2 setup request message, an X2 setup response message, an eNB configuration update message and an eNB configuration update acknowledge message. These messages are given as non-limiting examples, and other types of messages communicated between two or more base stations are possible to carry the proposed information The eNB software may be enhanced to identify a limited set of serving cells as handover candidates in X2 setup procedures and eNB configuration update procedures.

In an embodiment, an eNB may indicate handover candidate serving cells uniquely to each neighbouring eNB. This set of handover candidate cells may be tracked by an eNB independently for each neighbour eNB.

The tracking of handover candidate serving cells uniquely for each neighbouring eNB, and indicating them accordingly in X2 procedures, may be defined as serving cell management. An eNB may demarcate its serving cells as inner cells and outer cells. Inner cells are cells which have not been indicated as a handover candidate to any neighbouring eNB. Any cell indicated as an handover candidate to a neighbouring eNB is identified as an outer cell.

Additional handover candidate cells may be reported to neighbour eNBs based on triggers described below. These additional handover candidate cells may also be tracked on an individual neighbour eNB basis. In an embodiment, a served cell on an eNB can also be requested to be marked as a handover candidate by neighbouring eNBs. This process may be referred to as a dynamic query procedure. A dynamic query procedure may comprise determining the first subset of cells in dependence on a request received from the second base station, said request indicating at least one cell served by the first base station to be included in the first subset.

The method may comprise determining the at least one first cell to be suitable for handover in dependence on at least one of location, radio frequency measurements associated with a user equipment, X2 procedure information received from at least one neighbour base station, deployment configuration and operator selection.

For example, a first eNB may determine serving cells to be tagged as handover candidate in X2 procedures via various means such as, amongst others, eNB self determination based on geo-location, eNB determination based on UE reported RF measurements, eNB selection based on X2 procedure information received from neighbour eNBs, configuration as part of site deployment & commissioning and selected by the operator via O&M provided methods.

The additional served cell information and dynamic query of served cell information is used by mobility and self organising networks (SON) algorithms in a network deployment containing eNBs with varied number of serving cells. Various embodiments are described below which are realized by served cell management and handover candidate reporting via additional IEs.

Figure 5:
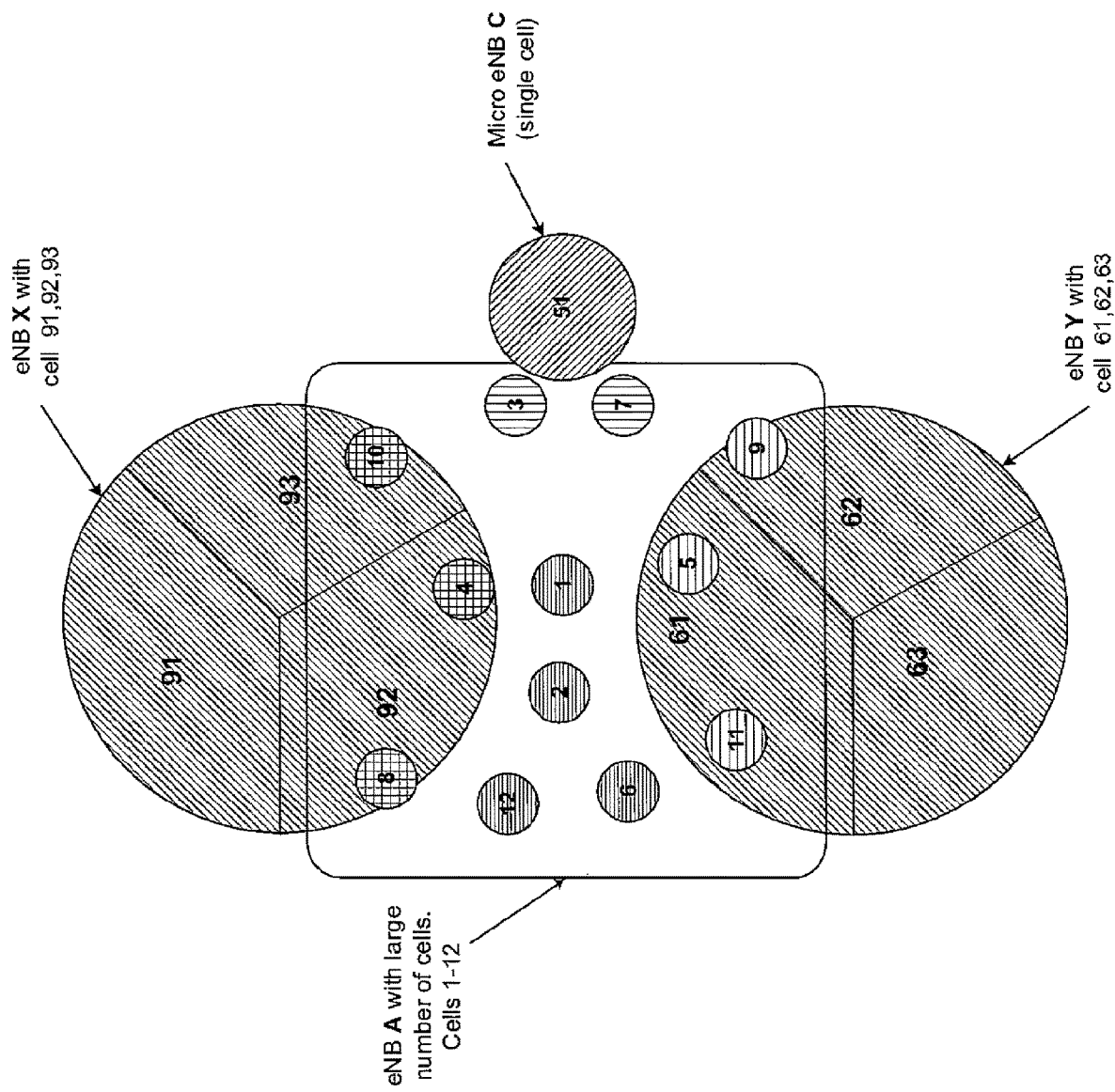
FIG. 5 shows a schematic diagram of an example communication network with eNBs of various cell size.

FIG. 5 depicts an example network with four eNBs; eNB A, eNB C, eNB X and eNB Y. Each eNB in the network shown in FIG. 5 has a varying number of associated cells. eNB A provides coverage for associated cells 1 to 12. eNB C provides coverage for a single associated cell 51. eNB X provides coverage for associated cells 91, 92 and 93. eNB Y provides coverage for associated cells 61, 62 and 63. Associated, or served, cells of eNB A are marked as handover candidates for different neighbours.

In an embodiment, described with reference to the network depicted in FIG. 5, eNB A indicates cells 4, 8 and 10 as handover candidate to eNB X. Similarly cells 3 & 7 are marked as handover candidate to eNB C, while cells 5, 9 & 11 are marked as handover candidates to eNB Y. Cells 1, 2, 6 and 12 are not indicated to any neighbouring eNB as handover candidates and are thus classified as inner cells. The rest of the served cells 3 to 5 and 8 to 11 associated with eNB A are classified as outer cells by eNB A.

Figure 6:
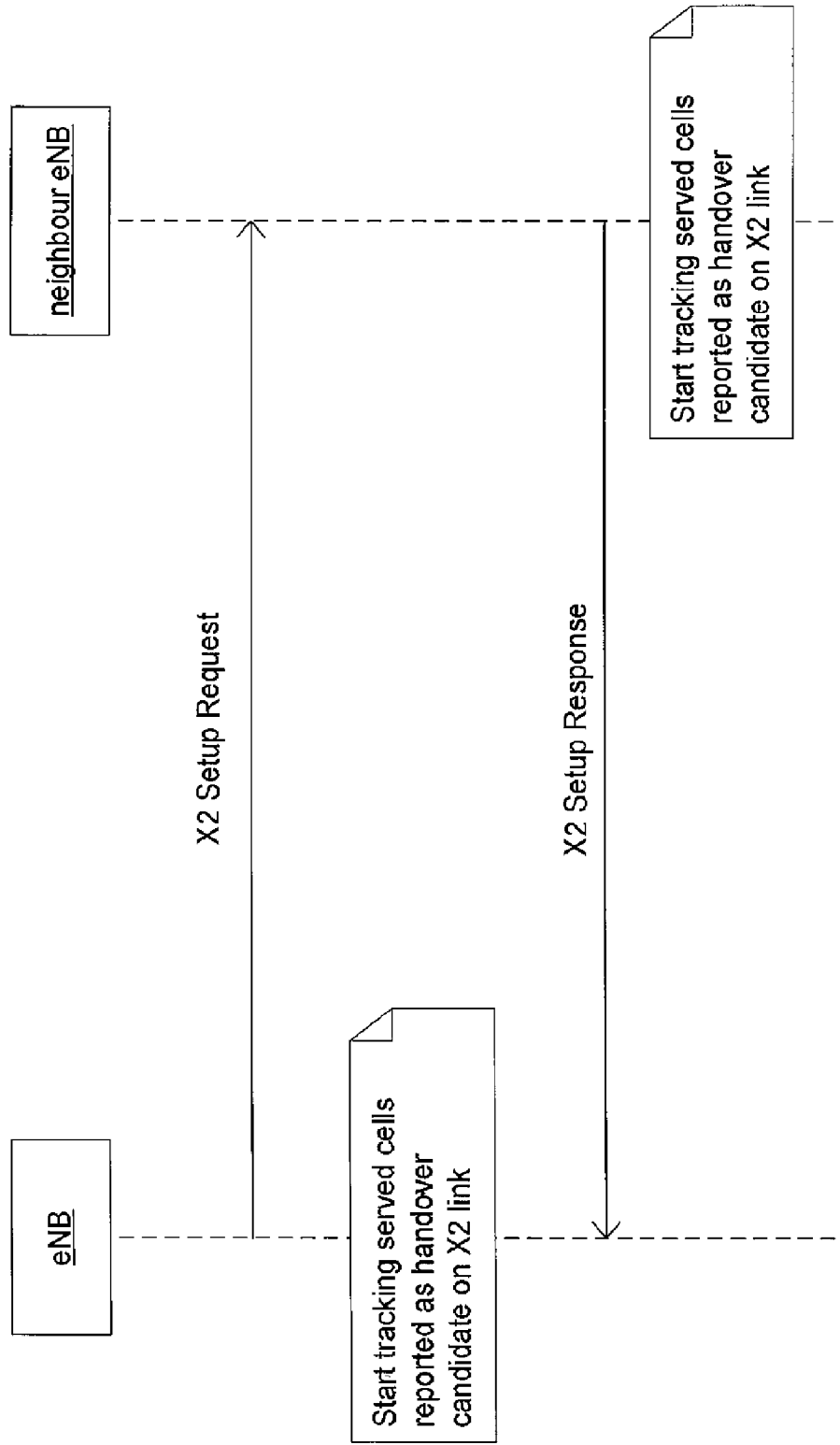
FIG. 6 shows an example signalling flowchart for X2 setup procedure.

FIG. 6 shows a signalling method for served cell reporting in X2 setup procedure.

An eNB may initiate management of serving cells for a particular neighbour eNB when X2 Setup procedure is triggered. The eNB managing serving cells may either initiate the X2 Setup procedure or receive the X2 Setup request from a neighbour eNB.

FIG. 6 shows X2 messaging when an eNB deploying serving cell management initiates X2 Setup procedure. In the X2 setup request, eNB sends all serving cells to neighbour eNB but marks a limited number of cells of that eNB as handover candidate(s) and starts tracking those handover cells reported to this particular neighbour. Neighbour eNB may mark at least one cell as handover candidate cell in the X2 setup response. Neighbour eNB may also start tracking served cell(s) reported as handover candidate(s) in the X2 Setup response. The served cells reported as handover candidates in the X2 setup response are cells served by the neighbour eNB.

Tracking handover cells may comprise performing a serving cell management algorithm. eNB may use the serving cell management algorithm to dynamically select more cells to be handover candidate later on or remove handover designation from some cells. The handover designation for each cell is per neighbour eNB, tracking signifies that each served cell is individually managed for each neighbour eNB.

If X2 link setup procedure was triggered due to automatic neighbour relation (ANR) procedure, eNB may also include the target handover cell identification (based on, e.g., RF conditions reported by UE) in X2 Setup request. Neighbour eNB may mark the requested cell as handover candidate cell in the X2 setup response.

Figure 7:
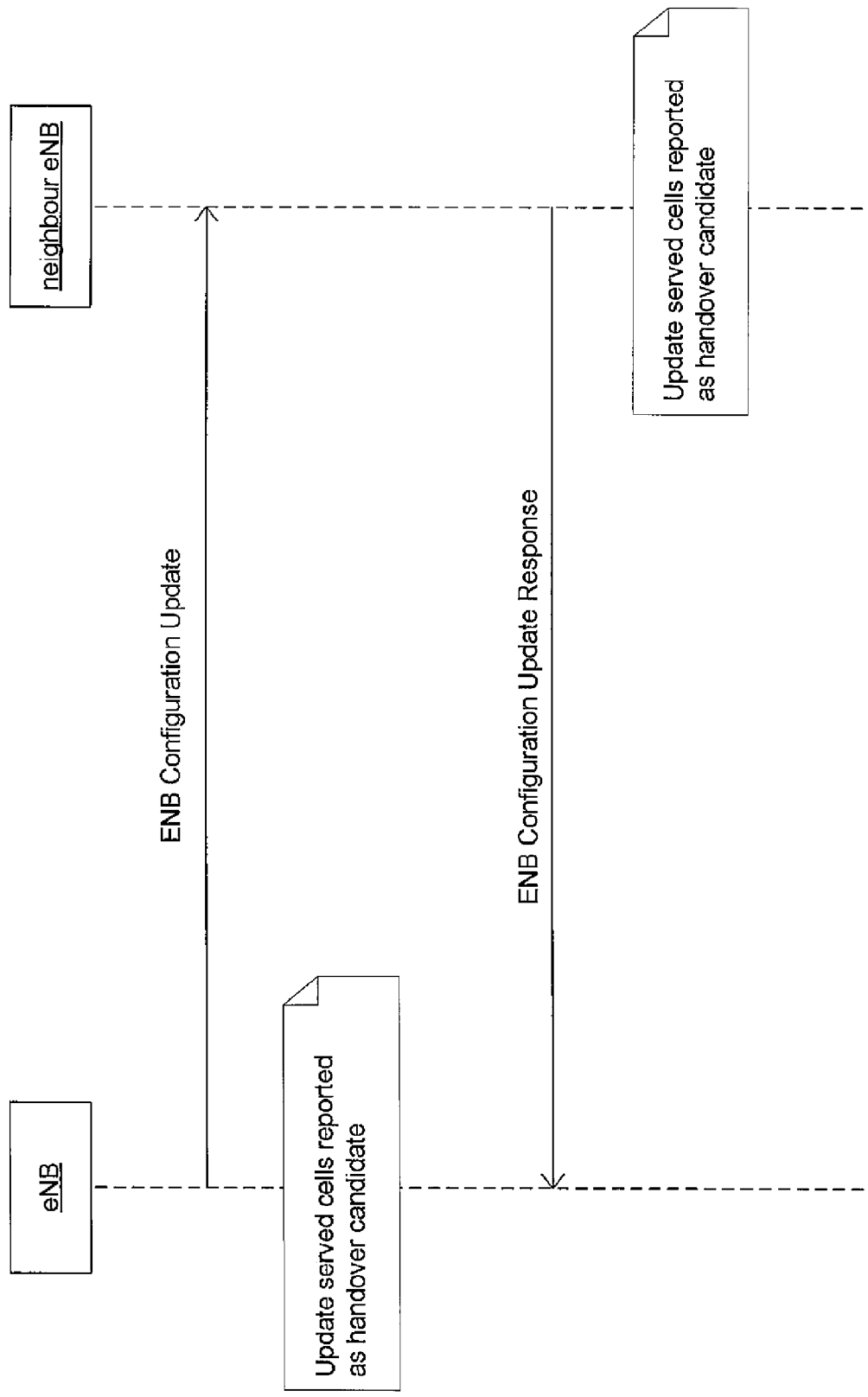
FIG. 7 an example signalling flowchart for eNB configuration update procedure.

An eNB may report additional serving cell(s) as handover candidates to a neighbour eNB via the eNB Configuration Update procedure. eNB adds these additional cells to the list of handover candidate cells reported in the X2 Setup procedure. FIG. 7 shows a signalling method for served cell reporting in an eNB configuration update procedure.

FIG. 7 shows eNB configuration update messaging when an eNB deploying serving cell management initiates eNB Configuration Update procedure. In such procedure, the eNB indicates one or more additional serving cell(s) of the eNB as handover candidate(s) to neighbour eNB in the eNB configuration update request message and adds them to cells tracked for this particular neighbour. In addition or alternatively, the eNB may also include identification of one or more requested target cells of the neighbour eNB (based on, e.g., radio frequency (RF) conditions reported by UE) in the eNB Configuration Update request message. Neighbour eNB may mark those requested cell(s) of the neighbour eNB as handover candidate(s) in the eNB Configuration Update Response message. Neighbour eNB also adds the additional handover candidate cell included in the eNB Configuration update Response message to its list of serving cells reported as handover candidates to the eNB which initiated eNB configuration update procedure.

In other words, requested target cell(s) of the neighbour eNB in the eNB Configuration Update request message means that the cell is requested, as part of the dynamic query, to be added to the list of handover candidate cells from the neighbour eNB. Let us take a non-limiting example of an X2 Setup procedure between two eNBs with three cells each. This example would apply similarly to eNB Configuration Update request/response messages where cells are added or modified.

In one embodiment, the process takes place without a dynamic query. Then the process may go as follows: eNB1 (with cells A, B, C) sends these three cells in X2 Setup Request to eNB2 (with cells X, Y, Z) and marks cell B as handover candidate. eNB2 responds with X2 Setup Response and marks cell Z as handover candidate. Thus, the eNB1 sends the request message and marks its handover candidate cells (i.e. cells of eNB1) in that request message, and then the eNB2 sends the response message and marks its handover candidate cells (i.e. cells of eNB2) in that response message.

In another embodiment where the dynamic query is applied, may go as follows: eNB1 (with cells A, B, C) sends these three cells in X2 Setup Request to eNB2 (with cells X,Y,Z) and marks cell B as handover candidate. In addition, eNB1 also requests cell X in eNB2 to be marked as a handover candidate. The eNB2 responds with X2 Setup Response and marks cell X and Z as handover candidates. In this case the inclusion of cell X as a handover candidate by eNB2 is a result of the request from the eNB1. The request of cell X as a handover candidate may be due to UE measurement results received by the eNB1.

With reference to the example shown in FIG. 5, if eNB A initiates X2 setup towards eNB B due to UE measurement report in cell 4 requesting handover to cell 92, only serving cell 4 is indicated as a handover candidate in the X2 Setup Request message and cell 92 is requested as a handover candidate from eNB B. eNB B marks cell 92 as handover candidate in the X2 Setup Response message. eNB A and B start tracking cells reported as handover candidate towards each other.

Figure 8:
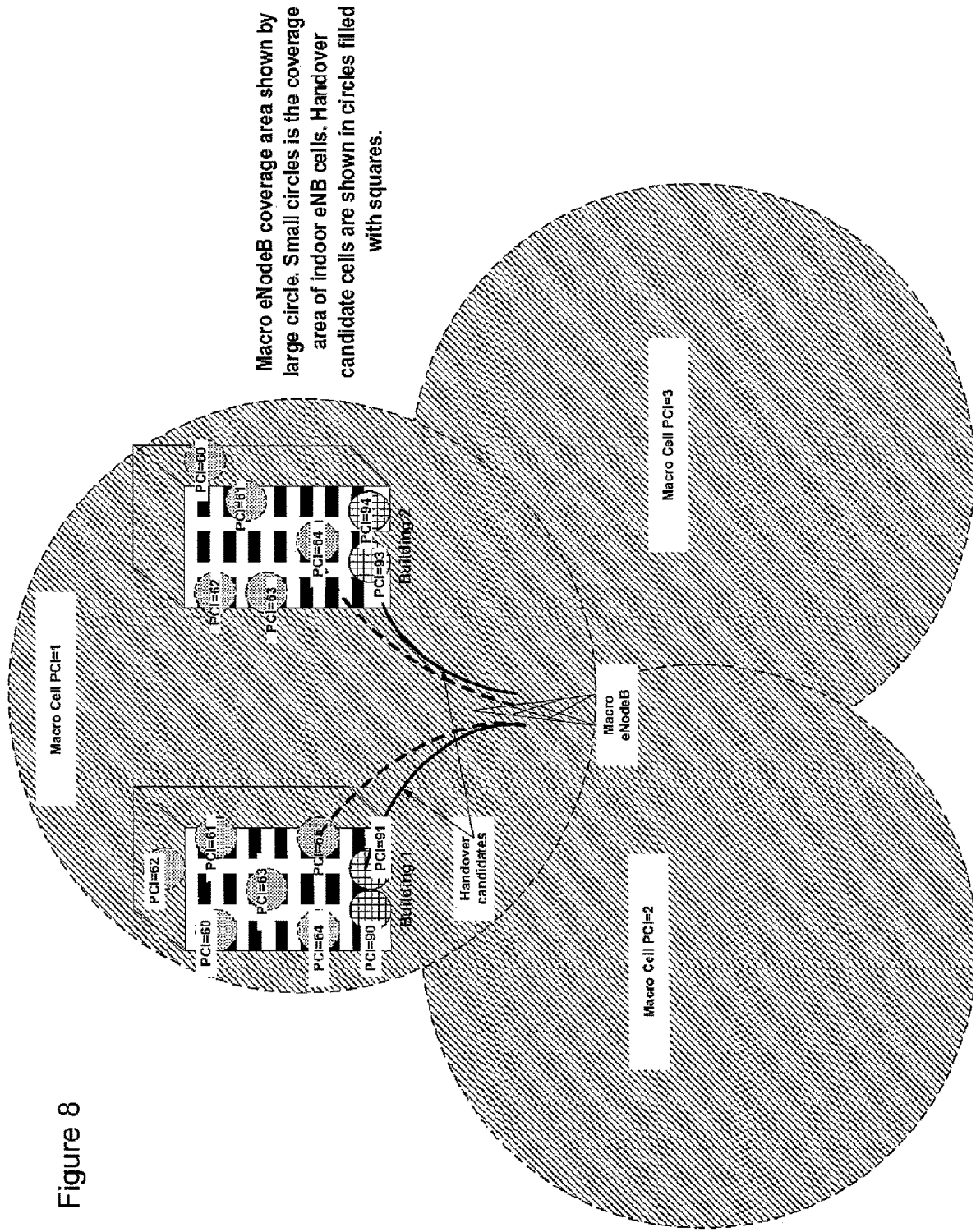
FIG. 8 shows a schematic diagram of an example communication network comprising cells with coverage overlap.

Serving cell information exchange with handover candidate indication may allow a smoother and deterministic transition for UEs moving between indoor and outdoor coverage. FIG. 8 depicts an example scenario of indoor/outdoor coverage overlap. Macro cell with PCI 1 has multiple buildings within its coverage area where a user can walk indoor and would need to transition to indoor coverage.

In an embodiment, indoor cells on ground level and levels close to the ground may be seen by the UE but indoor eNB indicates only the cells on ground level as handover candidate to Macro eNB. This ensures that outdoor to indoor transition occurs via the ground level cells of indoor eNB.

On the other hand, indoor to outdoor coverage transitions may take place from indoor cells on ground level. The indoor eNB may prevent handover to Macro eNB from cells on a higher level. This may reduce ping-pong between the indoor cell and the MeNB for a user on higher levels near building edge.

Separation of serving cells into handover candidate (outer) and non-handover candidate (inner) may allow self optimizing algorithms to select and reuse PCI values more effectively and also enable timely resolution of any conflicts which may arise. For large eNBs, selection of conflict and confusion free PCI values is not trivial. PCI reuse is simplified for such deployments, since cells which are not handover candidate (inner cells) can use any PCI value as long as Intra-eNB conflicts are resolved. Conflicts to external neighbour eNBs only need to be taken into account for cells which are marked as handover candidate (outer cells). When a conflict or confusion situation does arise, inner cells which are not marked for handover can be the first ones to select a new PCI.

Figure 9:
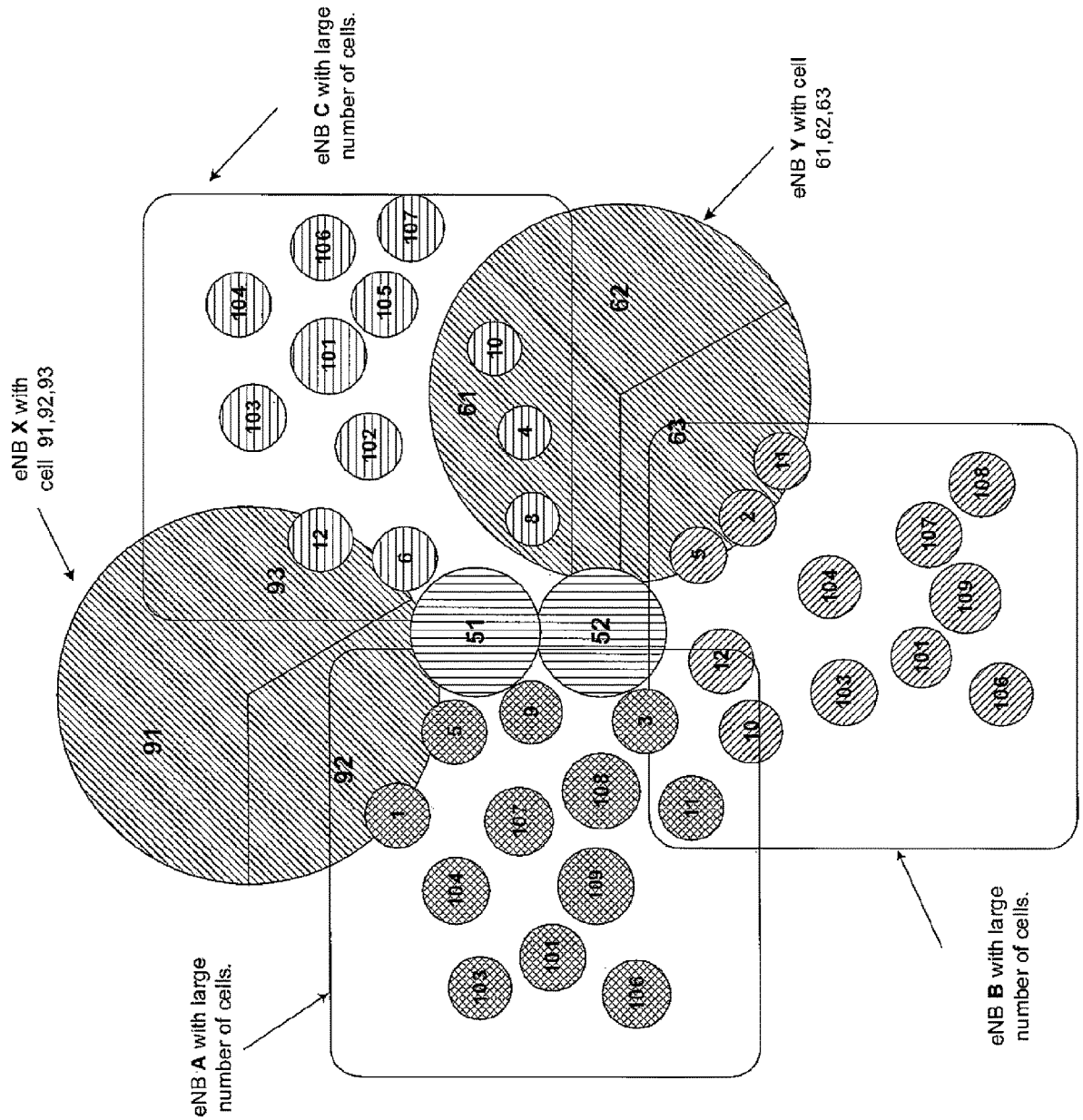
FIG. 9 shows a schematic diagram of an example communication network with eNBs of various cell size.

FIG. 9 shows an example deployment where Macro, Micro and large eNB are deployed. In the figure above, with the deployment of serving cell management, eNB A, B and C may reuse a set of PCI values without causing confusion in neighbour eNB (e.g. 101, 103 etc). Without serving cell management eNB A, B and C will not be able to reuse PCIs.

During handover initiation, a source eNB processes PCIs reported by UE in a measurement report to determine the target eNB serving the target cell. When large eNBs are neighbours, this processing may extend to hundreds of cells and add latency to the overall time required for handover to be prepared and executed.

In FIG. 9, eNB A and B may potentially exchange 256 serving cells as neighbours. Similarly eNB Y has multiple large eNBs as neighbour (maximum 512 neighbours from eNB A & B) and would need to process potentially 512 neighbours to select the correct target cell when UE requests a handover via measurement report.

Classification of a limited number of served cells as handover candidate (outer cells) optimizes handover processing time and overall latency observed by end user. eNB C may only send cell 4, 8 and 10 as neighbour candidate to eNB Y while eNB B may only send cells 2, 5 and 11 as neighbour candidate to eNB Y. This reduces the number of cells to be processed by eNB Y upon reception of measurement report from a UE.

Identification of a subset of serving cells as handover candidate may relax CPU cycles and memory requirements on eNB. This may be significant for small form factor pica/micro eNBs which are built on platforms which are resource constrained.

FIG. 9 shows single sector small scale eNBs (cell 51 & 52) deployed to fill in coverage gap between large eNBs. Without serving cell management, small form factor eNBs store all serving cells from large neighbour eNBs and process them when handover originates from small eNB.

When large neighbour eNBs indicate a subset of cells as handover candidates, small eNB can optimize resources by storing the configuration only for cells which are handover candidates (outer cells). In FIG. 9 eNB A may indicate cell 5 & 9 as handover candidates to micro eNB 51 while eNB C indicates cells 6 & 8 as handover candidates. Micro eNB 51 may thus store configuration data for only four cells instead of a maximum of 512 cells.

In an embodiment, if handover is desired to another cell of eNB A whose configuration data is not available, eNB 51 may request marking of that cell as a handover candidate via eNB Configuration Update procedure. This may trigger the eNB A to change the status of an inner cell to outer cell and indicate it as a handover candidate in eNB Configuration Update procedure to the eNB 51.

It should be understood that each block of the flowchart of FIG. 3 or 4 and any combination thereof may be implemented by various means or their combinations, such as hardware, software, firmware, one or more processors and/or circuitry.

Figure 10:
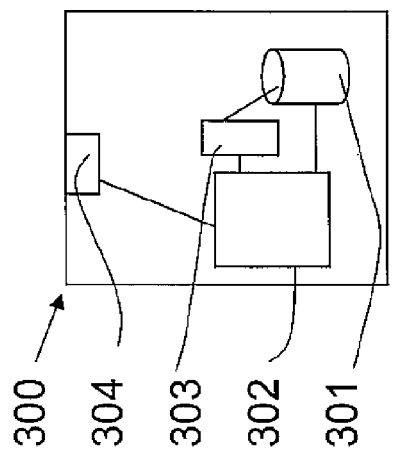
FIG. 10 shows a schematic diagram of an example control apparatus.

Embodiments described above by means of FIGS. 1 to 9 may be implemented on a control apparatus as shown in FIG. 10. FIG. 10 shows an example of a control apparatus for a communication system, for example to be coupled to and/or for controlling a station of an access system, such as a base station or (e) node B, or a server or host. In some embodiments, base stations comprise a separate apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions. Control functions may include determining a first subset of cells served by a first base station to be suitable for handover to a user equipment associated with a second base station, the subset comprising at least one but not all of the cells served by the first base station and providing information to the second base station from the first base station, said information comprising an indication of the determined first subset of cells.

Alternatively or in addition, control functions may include receiving information from a first base station at a second base station, said information comprising an indication of a first subset of cells served by the first base station determined to be suitable for handover to a user equipment associated with the second base station, the subset comprising at least one but not all of the cells served by the first base station.

It should be understood that the apparatuses may include or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to eNBs and LTE, similar principles can be applied to any other communication system or radio access technology, such as 5G. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments as described above by means of FIGS. 1 to 9 may be implemented by computer software executable by a data processor, at least one data processing unit or process of a device, such as a base station, e.g. eNB, or a UE, in, e.g., the processor entity, or by hardware, or by a combination of software and hardware. Computer software or program, also called program product, including software routines, applets and/or macros, may be stored in any apparatus-readable data storage medium or distribution medium and they include program instructions to perform particular tasks. An apparatus-readable data storage medium or distribution medium may be a non-transitory medium. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi core processor architecture, as non limiting examples.

Embodiments described above in relation to FIGS. 1 to 9 may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
   determining a first subset of cells served by a first base station to be suitable for handover of a user equipment associated with a second base station, the subset comprising at least one but not all of the cells served by the first base station;
   providing information to the second base station from the first base station, said information comprising an indication of the determined first subset of cells, wherein the information is provided in a configuration update message; and
      determining at least one second subset of cells served by the first base station to be suitable for handover of a user equipment associated with a third base station.

2. A method according to claim 1, comprising determining the first subset of cells to be suitable for handover in dependence on at least one of location, radio frequency measurements associated with a user equipment, X2 procedure information received from at least one neighbour base station, deployment configuration and operator selection.

3. The method according to claim 1, wherein the first base station is a first eNB and the second base station is a second eNB and the information is provided over an X2 interface.

4. The method according to claim 1, comprising determining the first subset of cells in dependence on a request received from the second base station, said request indicating at least one cell served by the first base station to be included in the first subset.

5. The method according to claim 4, wherein the request from the second base station is one of an X2 setup request message and an eNB configuration update request message.

6. The method according to claim 1, wherein the second subset of cells comprises at least one but not all of the cells served by the first base station.

7. The method of claim 1, wherein the second base station is a neighbour base station of the first base station, the subset of cells comprising a neighbour base station-specific subset of cells, which is specific to the second base station, including at least one but not all of the cells served by the first base station.

8. The method of claim 1, wherein the determining at least one second subset of cells comprises:
   determining at least one second subset of cells served by the first base station to be suitable for handover of a user equipment associated with a third base station, wherein the third base station is also a neighbour base station of the first base station, the second subset of cells comprising a neighbour base station-specific subset of cells, which is specific to the third base station, including at least one but not all of the cells served by the first base station.

9. An apparatus comprising:
   at least one processor and at least one memory including a computer program code, the at least one memory and the computer program code configured to, with the at least one processor, cause the apparatus at least to:
   determine a first subset of cells served by a first base station to be suitable for handover of a user equipment associated with a second base station, the subset comprising at least one but not all of the cells served by the first base station;
   provide information to the second base station from the first base station, said information comprising an indication of the determined first subset of cells, wherein the information is provided in a configuration update message; and
      determine at least one second subset of cells served by the first base station to be suitable for handover of a user equipment associated with a third base station.

10. The apparatus according to claim 9, wherein the at least one memory and the computer program code are configured, with the at least one processor, to cause the apparatus further to:
   determine the first subset of cells to be suitable for handover in dependence on at least one of location, radio frequency measurements associated with a user equipment, X2 procedure information received from at least one neighbour base station, deployment configuration and operator selection.

11. The apparatus according to claim 9, wherein the first base station is a first eNB and the second base station is a second eNB and the information is provided over an X2 interface.

12. The apparatus according to claim 9, wherein the at least one memory and the computer program code are configured, with the at least one processor, to cause the apparatus further to:
   determine the first subset of cells in dependence on a request received from the second base station, said request indicating at least one cell served by the first base station to be included in the first subset.

13. The apparatus according to claim 12, wherein the request from the second base station is one of an X2 setup request message and an eNB configuration update request message.

14. The apparatus according to claim 9, wherein the second subset of cells comprises at least one but not all of the cells served by the first base station.

15. A computer program product tangibly embodied on a non-transitory computer-readable medium, the computer program product including executable code that, when executed, is configured to cause a data processing apparatus to:
   determine a first subset of cells served by a first base station to be suitable for handover of a user equipment associated with a second base station, the subset comprising at least one but not all of the cells served by the first base station;

provide information to the second base station from the first base station, said information comprising an indication of the determined first subset of cells, wherein the information is provided in a configuration update message; and determine at least one second subset of cells served by the first base station to be suitable for handover of a user equipment associated with a third base station.

* * * * *